(12) United States Patent
Goto

(10) Patent No.: US 12,469,131 B2
(45) Date of Patent: Nov. 11, 2025

(54) MEDICAL IMAGE PROCESSING DEVICE AND METHOD OF OPERATING THE SAME

(71) Applicant: FUJIFILM Corporation, Tokyo (JP)

(72) Inventor: Misaki Goto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 421 days.

(21) Appl. No.: 18/056,186

(22) Filed: Nov. 16, 2022

(65) Prior Publication Data

US 2023/0162357 A1 May 25, 2023

(30) Foreign Application Priority Data

Nov. 19, 2021 (JP) ................................. 2021-188619

(51) Int. Cl.
*G06T 7/00* (2017.01)
*G06V 10/764* (2022.01)

(52) U.S. Cl.
CPC .......... *G06T 7/0012* (2013.01); *G06V 10/764* (2022.01); *G06T 2207/10068* (2013.01); *G06T 2207/20104* (2013.01); *G06T 2207/30096* (2013.01)

(58) Field of Classification Search
CPC ......... G06T 7/0012; G06T 2207/10068; G06T 2007/20104; G06T 2207/30096; G06V 10/764
See application file for complete search history.

(56) References Cited

U.S. PATENT DOCUMENTS

2006/0280333 A1 12/2006 Ikeda et al.
2015/0254826 A1 9/2015 Kanda et al.
2020/0027207 A1 1/2020 Zhang et al.
2020/0069160 A1* 3/2020 Oosake ............ A61B 1/000094
2021/0052137 A1* 2/2021 Miura .................... G06F 18/214
2021/0233298 A1 7/2021 Usuda

FOREIGN PATENT DOCUMENTS

| JP | 2006-350578 A | 12/2006 |
| JP | 2014-104293 A | 6/2014 |
| WO | 2019/230302 A1 | 5/2019 |
| WO | 2020/090731 A1 | 5/2020 |

OTHER PUBLICATIONS

NPL: 2011-2023.*
An Office Action; "Notice of Reasons for Refusal," mailed by the Japanese Patent Office on Jul. 15, 2025, which corresponds to Japanese Patent Application No. 2021-188619 and is related to U.S. Appl. No. 18/056,186; with English language translation.

* cited by examiner

*Primary Examiner* — Quang N Vo
(74) *Attorney, Agent, or Firm* — Studebaker Brackett PLLC

(57) ABSTRACT

A medical image processing device includes an image acquisition unit that acquires an endoscopic image, an bounding box acquisition unit that acquires a bounding box which corresponds to an object to be detected shown in the endoscopic image and in which at least a part of the object to be detected is included, an adjustment unit that changes the position of the bounding box and reduces the area of the bounding box on the basis of the endoscopic image, and a storage controller that associates a new adjusted bounding box with the endoscopic image and stores the new adjusted bounding box and the endoscopic image.

15 Claims, 11 Drawing Sheets

(A)

(B)

MEDICAL IMAGE PROCESSING DEVICE AND METHOD OF OPERATING THE SAME

CROSS-REFERENCE TO RELATED APPLICATIONS

This application claims priority under 35 U.S.C § 119(a) to Japanese Patent Application No. 2021-188619 filed on 19 Nov. 2021. The above application is hereby expressly incorporated by reference, in its entirety, into the present application.

BACKGROUND OF THE INVENTION

1. Field of the Invention

The present invention relates to a medical image processing device and a method of operating the medical image processing device.

2. Description of the Related Art

In recent years, detecting an object, such as people and an animal, from an input image using machine learning, such as deep learning, has been disseminated in the field of image processing. In such machine learning for detecting an object, machine learning is often performed using a rectangular region, which is called a bounding box including an object to be detected, as correct answer data. Further, a plurality of correct answer data are accumulated and machine learning is performed, so that a discriminator is generated. The discriminator extracts an object to be detected from an input image and performs convolutional calculation to discriminate the type of the object and to extract the position of the object.

The above-mentioned machine learning for detecting an object also has been disseminated in a medical field, and a computer aided diagnosis (hereinafter, referred to as CAD) system, which analyzes a medical image, such as an endoscopic image, to automatically detect an object to be detected, such as a lesion, and performs the highlighting or the like of the detected object to be detected, is known.

Meanwhile, in machine learning for detecting a lesion, a medical doctor inputs a coordinate position in a medical image using an input device and uses a bounding box as a rectangular region, which includes a lesion, as correct answer data (see WO2019/230302A, corresponding to US2021/052137A1). Then, the medical doctor associates the bounding box with the medical image and records the bounding box and the medical image or inputs the bounding box and the medical image to a learning unit for machine learning.

SUMMARY OF THE INVENTION

However, in the detection of a lesion in a medical field, it may not be suitable to specify a lesion using a rectangular region depending on the shape of the lesion. In a case where the image of the inside of an organ having a tubular shape, for example, the lumen of the esophagus is picked up with an endoscope, a circumferential lesion circling the lumen in a circumferential direction may be present. The circumferential lesion has the shape of, for example, a doughnut or a crescent in an endoscopic image. In a case where a bounding box, which is a rectangular region, is acquired for the lesion having such a shape, most of a region inside the bounding box may be unrelated to the lesion. For this reason, the bounding box cannot be used as correct answer data for machine learning.

Further, in a case where a bounding box is acquired for a lesion having the shape of a doughnut or a crescent and machine learning is performed using the bounding box as correct answer data, a normal mucous membrane portion, which occupies most of a region in the bounding box, and a boundary between the shadow of the back of the lumen and a mucous membrane are learned. For this reason, there is a possibility that a lesion may be detected in an input image having the same angle even through there is actually no lesion.

An object of the present invention is to provide a medical image processing device that can acquire a bounding box suitable for machine learning from a medical image and a method of operating the medical image processing device.

A medical image processing device according to an aspect of the present invention comprises a processor, and the processor acquires a medical image, acquires a bounding box that corresponds to an object to be detected shown in the acquired medical image and indicates a first region in which at least a part of the object to be detected is included, makes an adjustment for changing a position of the bounding box in the medical image and reducing an area of the bounding box on the basis of the medical image, and associates a new adjusted bounding box with the medical image.

It is preferable that the processor acquires the object to be detected shown in the medical image as a second region, analyzes brightness information or pixel information of the first region and the second region, and adjusts the bounding box in a case where a result of the analysis satisfies a certain condition. It is preferable that the processor extracts a contour of the object to be detected from the medical image and acquires a region inside the contour as the second region. It is preferable that the processor analyzes the medical image, extracts the contour of the object to be detected according to a brightness value or a pixel value of the medical image, and acquires the second region.

It is preferable that the processor calculates a ratio of the second region to the first region as the analysis and adjusts the bounding box in a case where the ratio is equal to or less than a certain threshold value.

It is preferable that the processor extracts a low-brightness region having a brightness value equal to or less than a certain value in the first region and adjusts the bounding box in a case where a ratio of the low-brightness region to the first region is equal to or larger than a certain threshold value.

It is preferable that the processor calculates a ratio of the bounding box to the medical image and adjusts the bounding box in a case where the ratio is equal to or larger than a certain threshold value.

It is preferable that the processor adjusts the bounding box in a case where a distance between a center or a centroid of the bounding box and a center of the medical image is equal to or less than a certain threshold value.

It is preferable that the processor uses brightness values or pixel values of the first region and the second region to calculate an object-to-be-detected centroid that is a centroid of the object to be detected, an object-to-be-detected moment that is a moment around the object-to-be-detected centroid, and a bounding box moment that is a moment of the bounding box around the object-to-be-detected centroid, and changes a centroid of the bounding box and a width and a height of the bounding box using the object-to-be-detected centroid, the object-to-be-detected moment, and the bounding box moment, as the adjustment.

It is preferable that, as the adjustment, the processor causes a position of the centroid of the bounding box to coincide with a position of the object-to-be-detected centroid, calculates a ratio of the bounding box moment to the object-to-be-detected moment, and reduces the width and/or the height and calculates the bounding box moment again in a case where the ratio exceeds a certain threshold value and determines the width and the height in a case where the ratio is equal to or less than the certain threshold value.

It is preferable that the processor excludes a low-brightness region having a brightness value equal to or less than a certain value in the bounding box and calculates a new bounding box, which is circumscribed about a new second region of the medical image excluding the low-brightness region, as the adjustment.

It is preferable that, in a case where the second region is divided into regions since the low-brightness region is excluded, the processor calculates new bounding boxes circumscribed about the divided regions of the second region, respectively.

It is preferable that the medical image and the new adjusted bounding box associated with the medical image are stored.

It is preferable that the medical image processing device further comprises a learning unit to which the medical image and the new adjusted bounding box associated with the medical image are input and which performs machine learning for the object to be detected.

It is preferable that the medical image is an endoscopic image obtained in a case where an image of a lumen in a body having a dimension in a depth direction larger than a dimension in a radial direction is picked up with an endoscope, and the object to be detected is a lesion area.

It is preferable that, in a case where the processor is to acquire the bounding box not yet adjusted, the processor receives the bounding box input by a user.

It is preferable that, in a case where the processor is to acquire the bounding box not yet adjusted, the processor extracts the object to be detected shown in the medical image and calculates the bounding box circumscribed about the extracted object to be detected.

A method of operating a medical image processing device according to another aspect of the present invention comprises a step of acquiring a medical image, a step of acquiring a bounding box that corresponds to an object to be detected shown in the acquired medical image and indicates a first region in which at least a part of the object to be detected is included, a step of making an adjustment for changing a position of the bounding box in the medical image and reducing an area of the bounding box on the basis of the medical image, and a step of associating a new adjusted bounding box with the medical image.

According to the present invention, it is possible to acquire a bounding box suitable for machine learning from a medical image.

Figure 3:
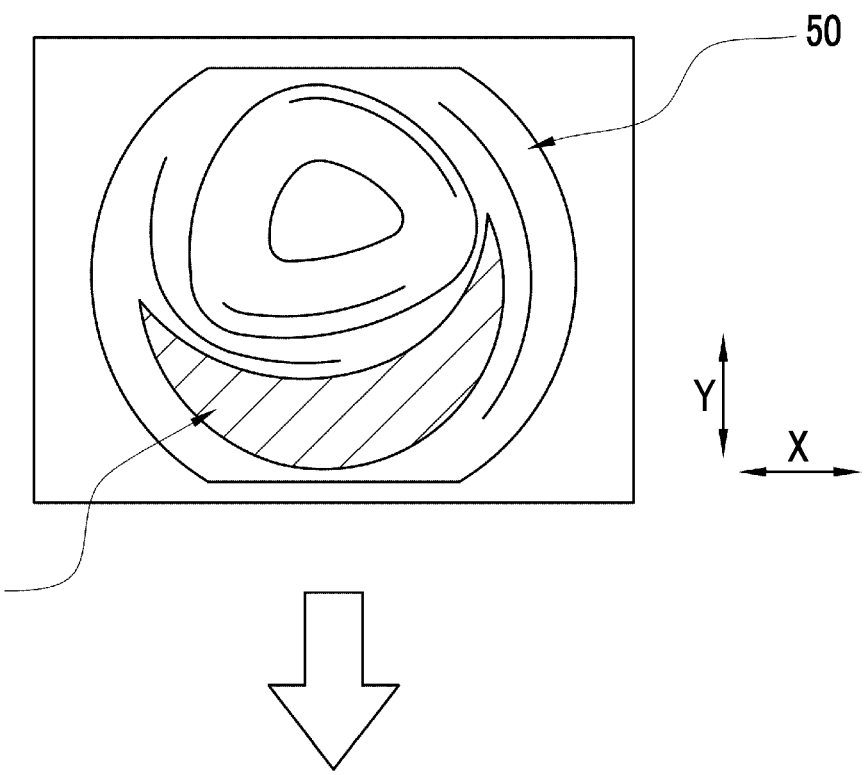
Figure 3:
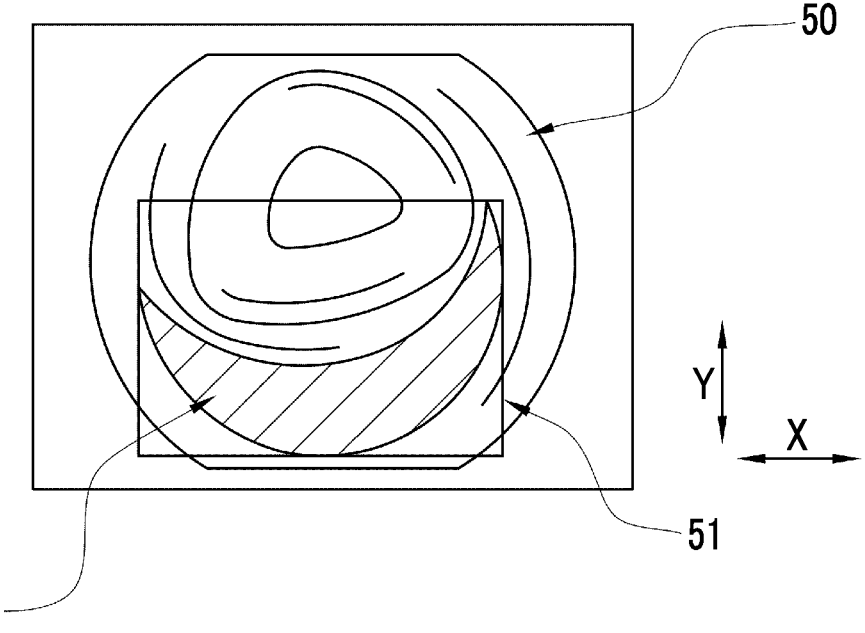

(A) and (B) of FIG. 3 are a diagram illustrating the acquisition of a bounding box.

Figure 4:
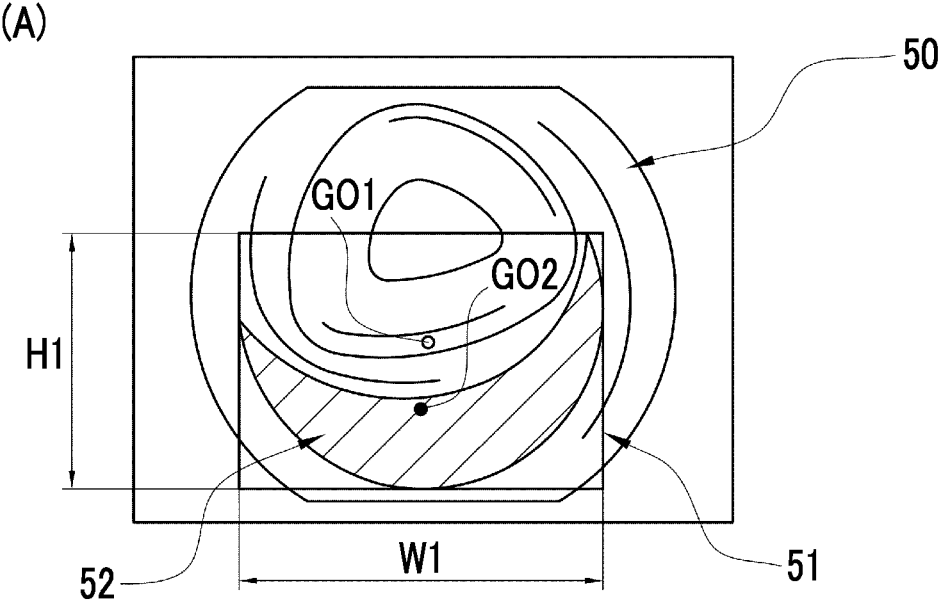
Figure 4:
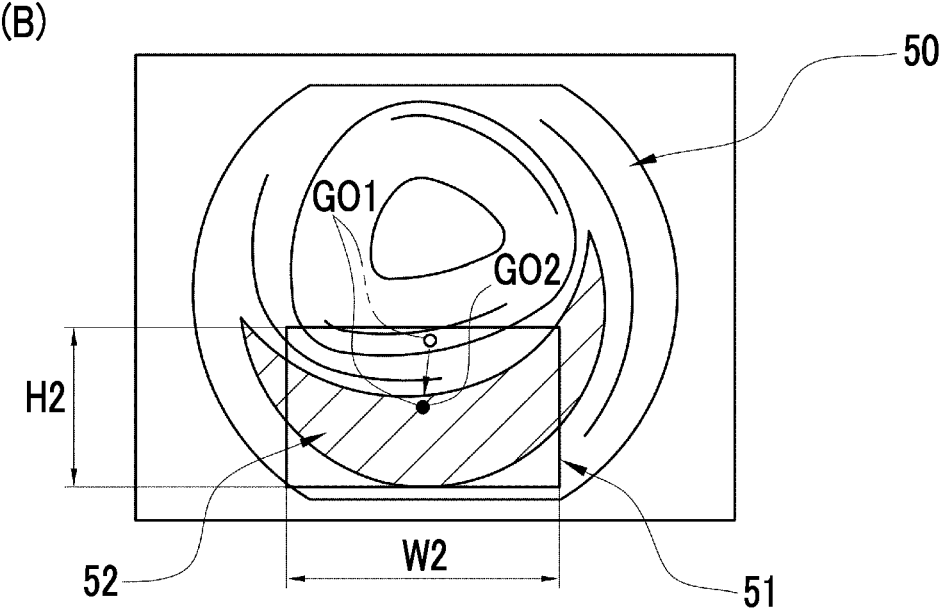

(A) and (B) of FIG. 4 are a diagram illustrating an example of the adjustment of the bounding box using the brightness information of a first region and a second region.

Figure 5:
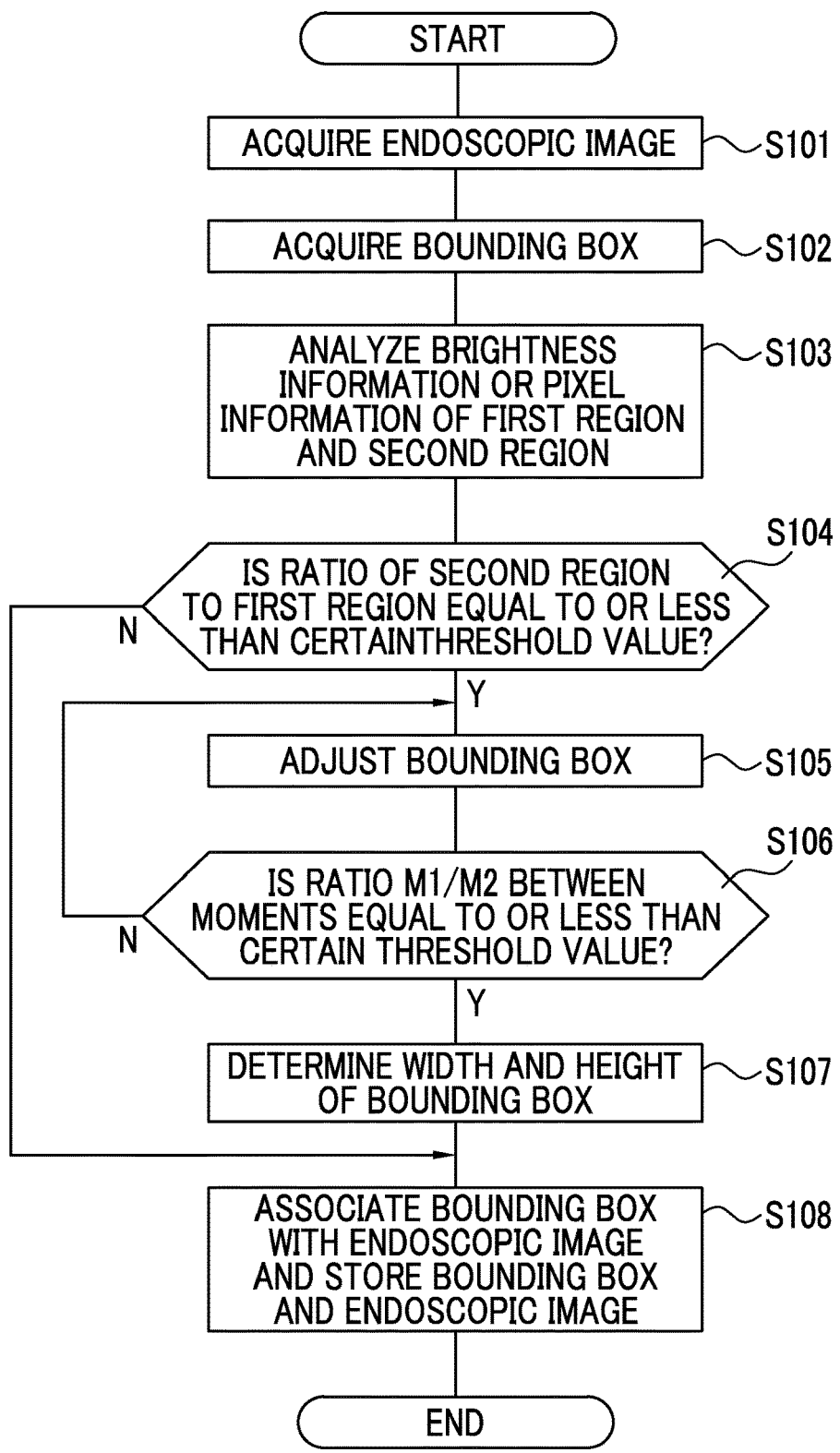

FIG. 5 is a flowchart related to the adjustment and storage of a bounding box of a first embodiment.

Figure 6:
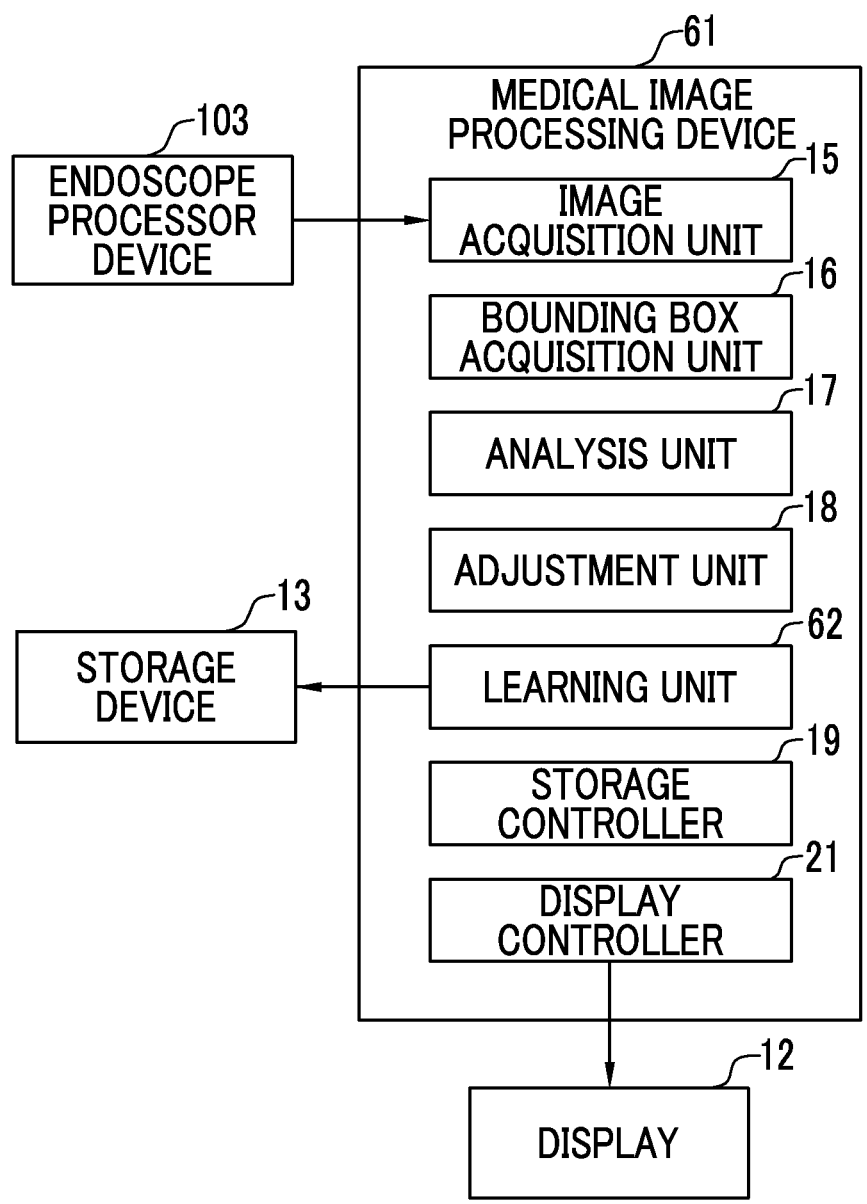

FIG. 6 is a block diagram showing the functions of a medical image processing device according to a second embodiment.

Figure 7:
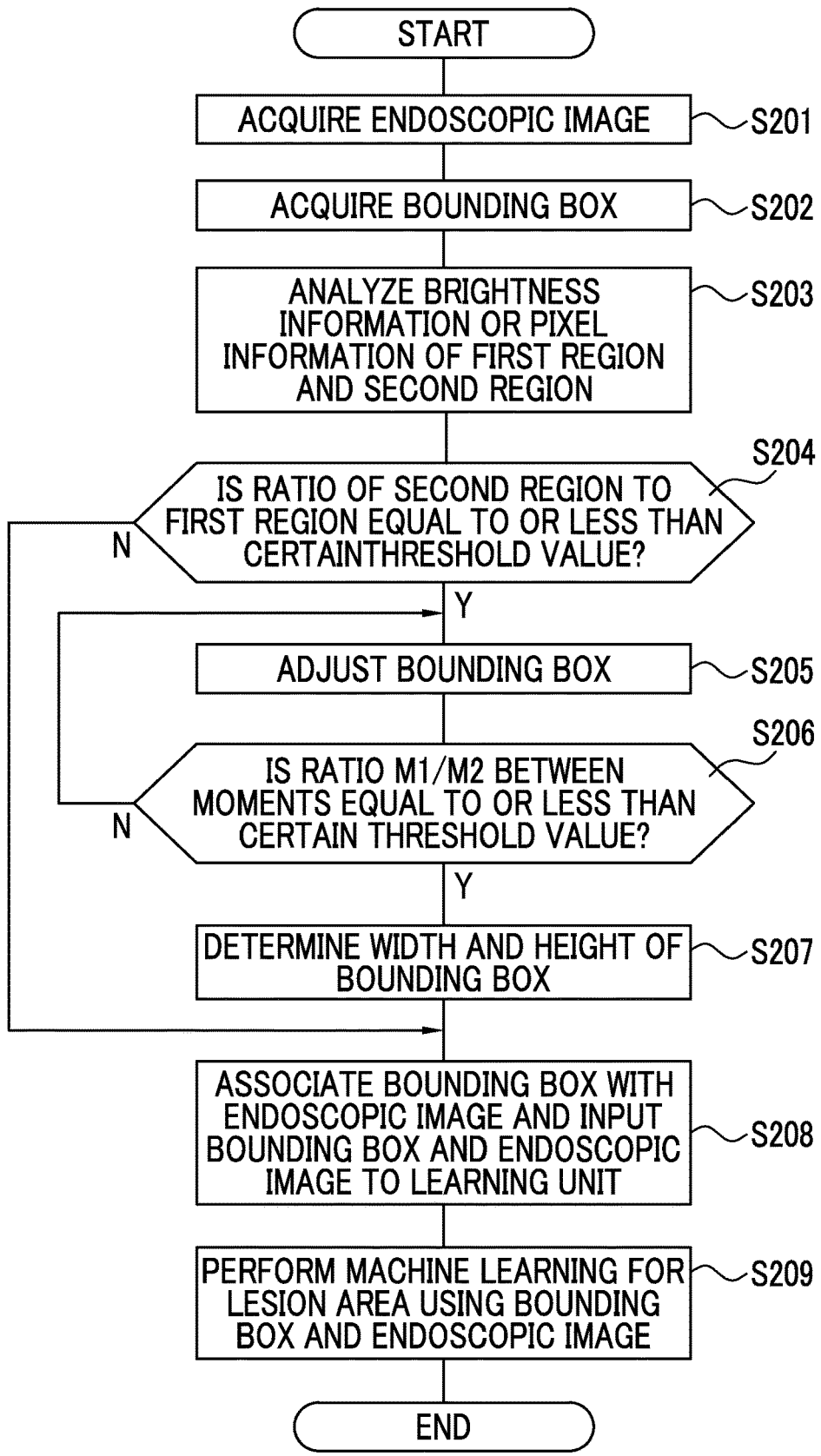

FIG. 7 is a flowchart related to the adjustment of a bounding box of a second embodiment and an input of the bounding box to a learning unit.

Figure 8:
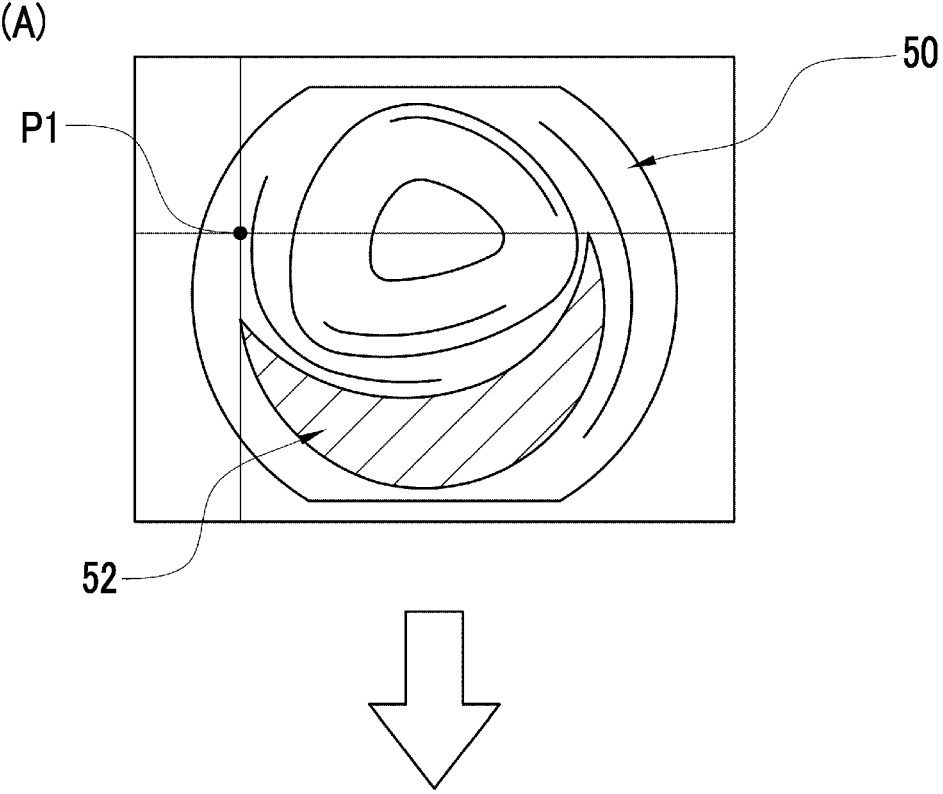
Figure 8:
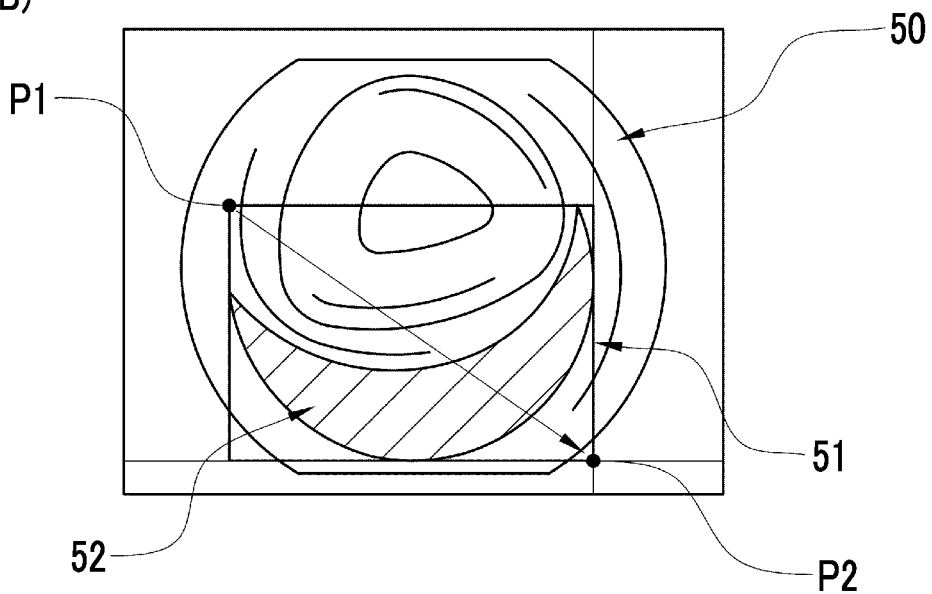

(A) and (B) of FIG. 8 are a diagram illustrating that a bounding box of a first modification example input by a user is received to be acquired.

Figure 9:
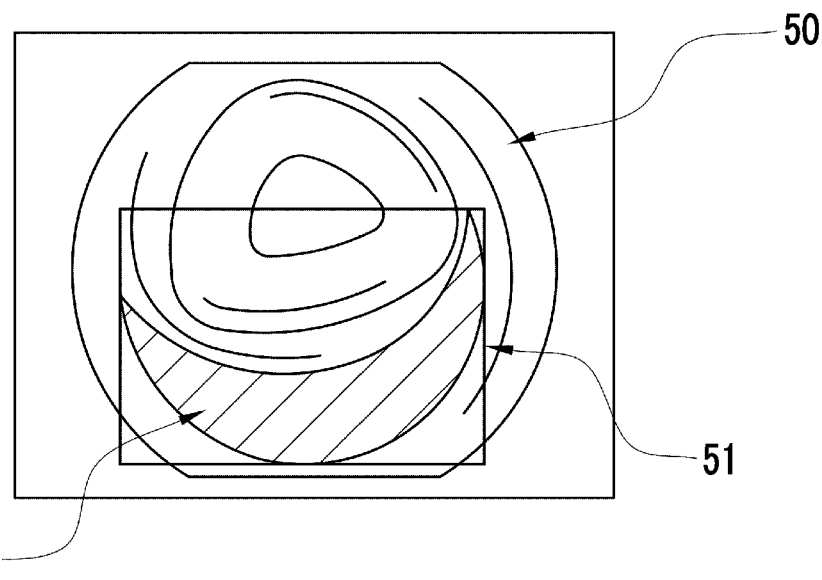
Figure 9:
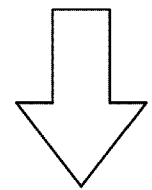
Figure 9:
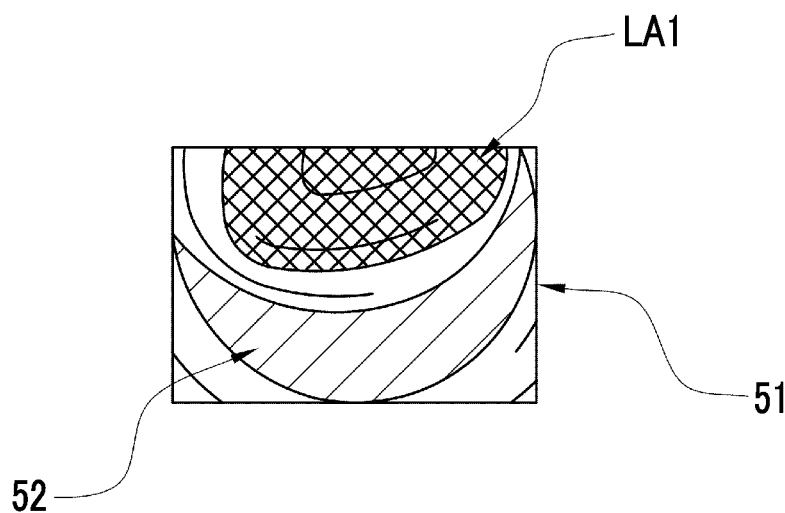

(A) and (B) of FIG. 9 are a diagram illustrating an example in a case where a low-brightness region is extracted from a first region of a second modification example.

Figure 10:
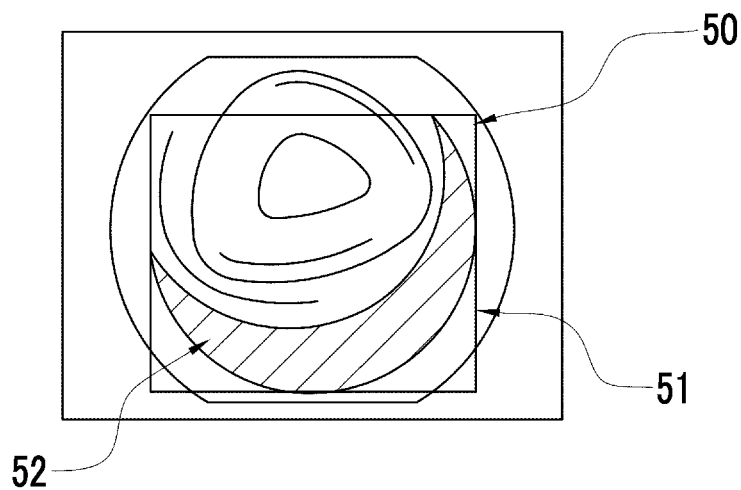

FIG. 10 is a diagram illustrating an example of a case where a ratio of a bounding box to an endoscopic image of a third modification example is equal to or larger than a certain threshold value.

Figure 11:
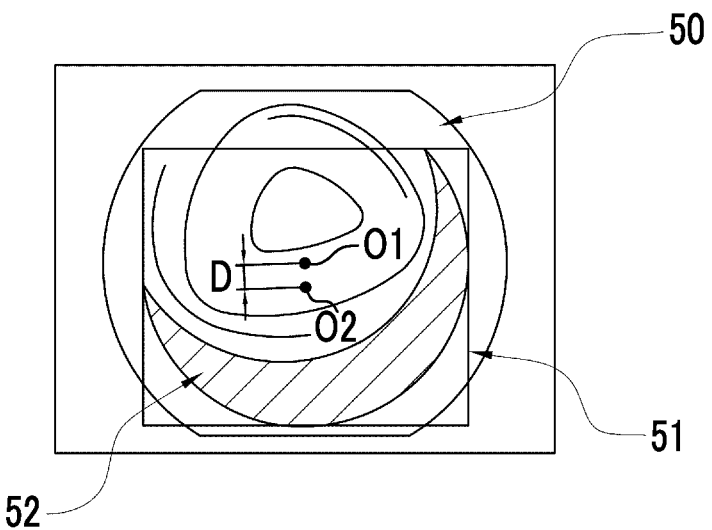

FIG. 11 is a diagram illustrating an example of a case where a distance between a center of a bounding box of a fourth modification example and a center of an endoscopic image is equal to or less than a certain threshold value.

Figure 12:
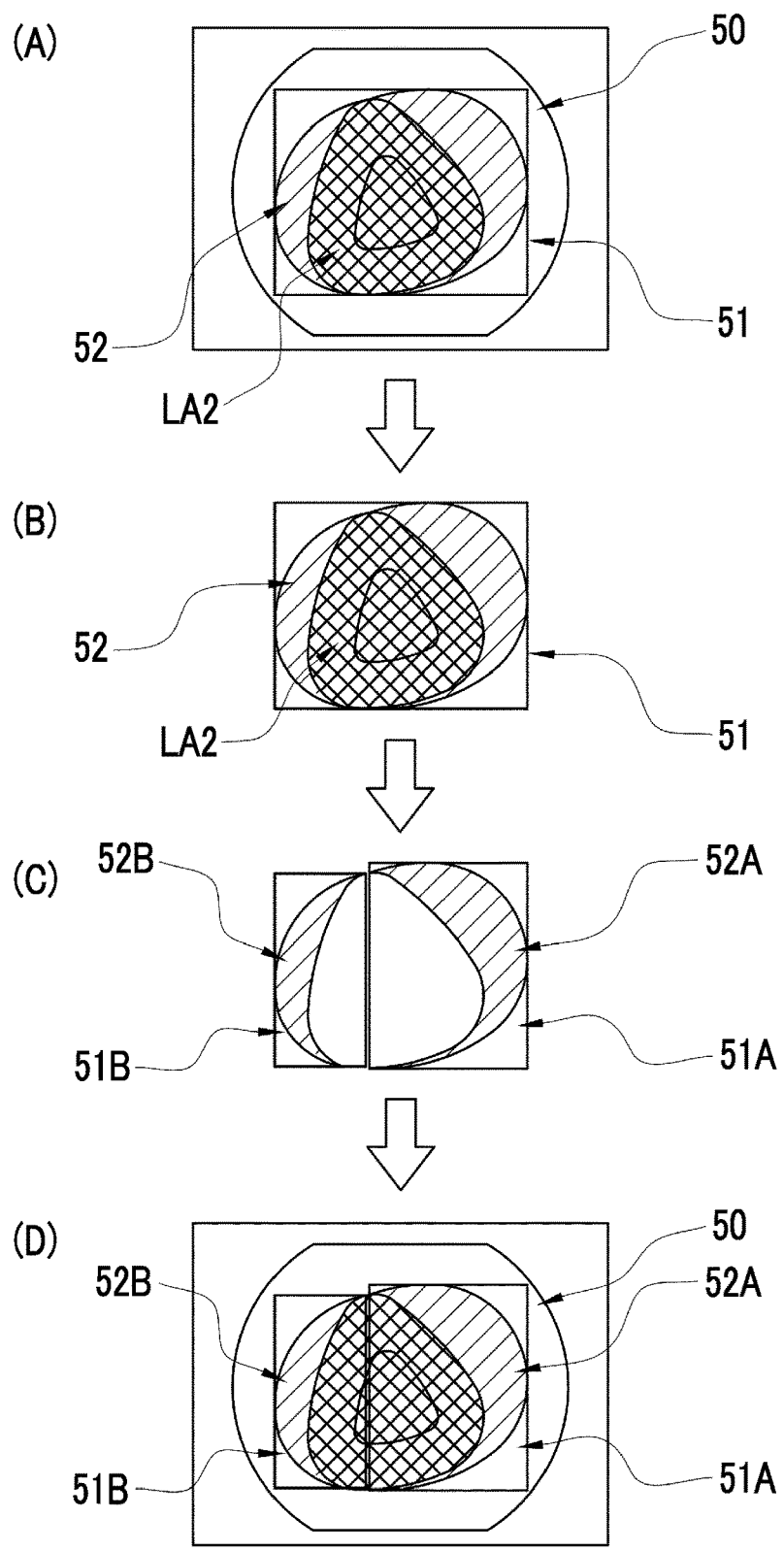

(A), (B), (C), and (D) of FIG. 12 are a diagram illustrating a case where bounding boxes are set in new second regions excluding a low-brightness region of a fifth modification example.

DESCRIPTION OF THE PREFERRED EMBODIMENTS

First Embodiment

Figure 1:
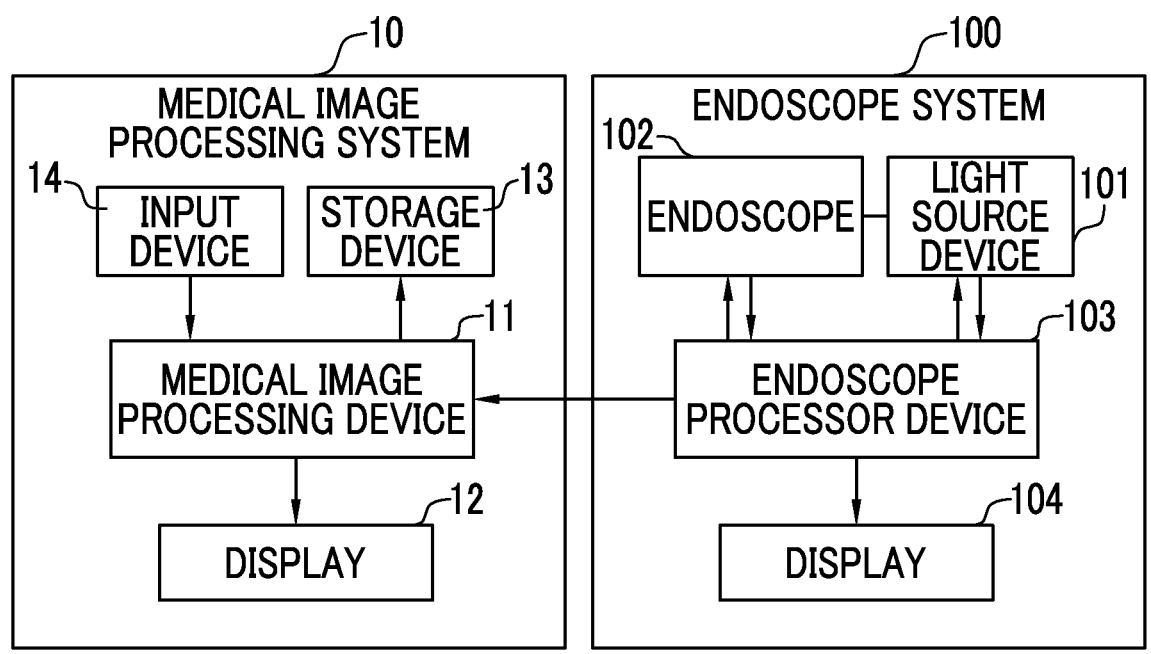
FIG. 1 is a block diagram showing the functions of a medical image processing system and an endoscope system.

As shown in FIG. 1, a medical image processing system 10 is connected to an endoscope system 100. The endoscope system 100 acquires endoscopic images that are obtained from the image pickup of an inside of a body, such as an alimentary canal.

The endoscope system 100 comprises a light source device 101, an endoscope 102, an endoscope processor device 103, and a display 104. The light source device 101 supplies illumination light, with which the inside of a subject is to be irradiated, to the endoscope 102. The endoscope 102 irradiates a subject with at least one of light in a white-light wavelength range or light in a specific wavelength range and picks up images of the subject to acquire endoscopic images. The light in the specific wavelength range, which is used as the illumination light by the endoscope 102, is, for example, light in a wavelength range shorter than a green-light wavelength range, particularly, light in a blue-light wavelength range or a violet-light wavelength range of a visible-light wavelength range.

The endoscope processor device 103 sequentially acquires the endoscopic images picked up by the endoscope 102, and performs various types of image processing on the acquired endoscopic images. The endoscopic images subjected to the various types of image processing are displayed on the display 104. Endoscopic images 50 (medical images) (see FIG. 2), which are not yet subjected to or have been subjected to the various types of image processing, are transmitted to the medical image processing system 10 from the endoscope processor device 103.

The endoscopic images 50 transmitted to the medical image processing system 10 from the endoscope processor device 103 are based on static images or a video that is picked up by the endoscope 102. The video picked up by the endoscope 102 is formed of the plurality of endoscopic images 50 that are picked up in chronological order. The medical image processing system 10 can acquire frame images of the video as the endoscopic images 50, which are static images, after an examination.

The medical image processing system 10 comprises a medical image processing device 11, a display 12, a storage device 13, and an input device 14. The display 12 is provided separately from the display 104 of the endoscope system, but the display 12 may be removed from the medical image processing system 10 and the display 104 may be used for both the medical image processing system 10 and the endoscope system. The input device 14 includes a keyboard (not shown), a mouse (not shown), a touch panel of the display 12, and/or the like.

Figure 2:
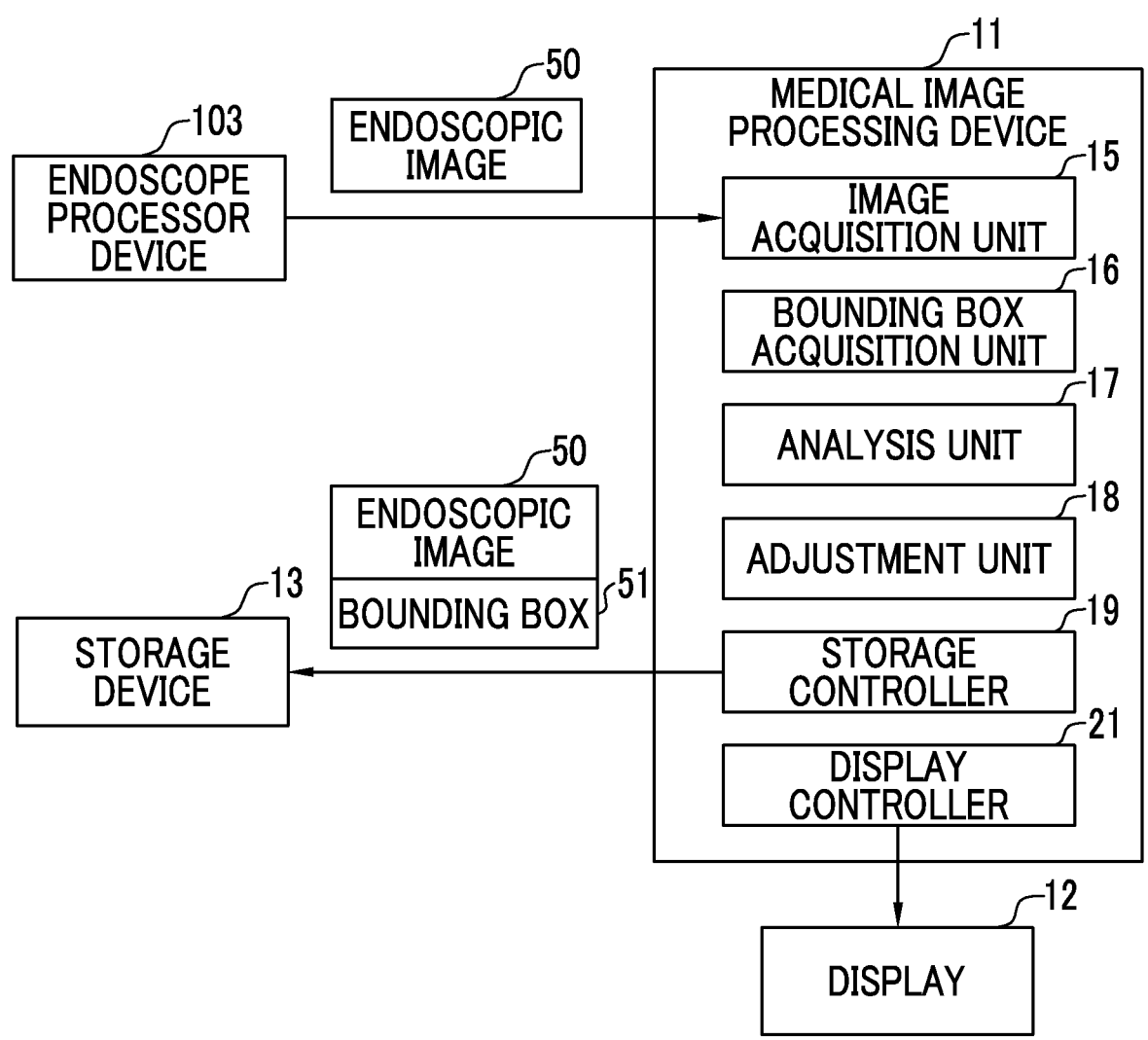
FIG. 2 is a block diagram showing the functions of a medical image processing device.

As shown in FIG. 2, the medical image processing device 11 acquires the endoscopic images 50 transmitted from the endoscope processor device 103 of the endoscope system 100. The medical image processing device 11 comprises an image acquisition unit 15, a bounding box acquisition unit 16, an analysis unit 17, an adjustment unit 18, a storage controller 19, and a display controller 21. The image acquisition unit 15 sequentially acquires the endoscopic images 50 transmitted from the endoscope processor device 103.

The medical image processing device 11 is formed of a well-known computer, and a program related to the various types of processing is incorporated in a program memory (not shown). The medical image processing device 11 is provided with a central controller (not shown) that is formed of a processor. The central controller executes the program incorporated in the program memory, so that the functions of the image acquisition unit 15, the bounding box acquisition unit 16, the analysis unit 17, the adjustment unit 18, the storage controller 19, and the display controller 21 are realized.

As shown in (A) and (B) of FIG. 3, the bounding box acquisition unit 16 acquires a bounding box 51 from the endoscopic image 50 that is acquired by the image acquisition unit 15. The bounding box 51 corresponds to a lesion area 52 (an object to be detected) shown in the endoscopic image 50, and indicates a rectangular first region in which at least a part of the lesion area 52 is included. The lesion area 52 is, for example, a cancer, a polyp, or the like.

The endoscopic image 50 exemplified in this embodiment is obtained in a case where an image of a lumen in a body, such as a small intestine, a large intestine, an esophagus, or a blood vessel, having a dimension in a depth direction larger than a dimension in a radial direction, is picked up by an endoscope. Further, in a case where the image of such a lumen in a body is picked up, a crescent or doughnut-shaped lesion area shown in (A) and (B) of FIG. 3 is likely to be present.

In this embodiment, the bounding box acquisition unit 16 calculates, for example, feature quantities of the endoscopic image 50 and includes a convolutional neural network (CNN) that performs processing for recognizing the lesion area 52 in the image. Accordingly, the bounding box acquisition unit 16 detects the lesion area 52 from the endoscopic image 50 (see (A) of FIG. 3).

The bounding box acquisition unit 16 calculates a rectangular first region that is circumscribed about the lesion area 52 detected using CNN or the like, that is, the position, width, and height of the bounding box 51 from the endoscopic image 50 (see (B) of FIG. 3). "A rectangle that is circumscribed" mentioned here is a rectangle that is circumscribed about the lesion area 52 and has two sides parallel to a horizontal axis (X axis) of the endoscopic image 50 and two sides parallel to a vertical axis (Y axis) of the endoscopic image 50.

A configuration, which is used in a case where the bounding box acquisition unit 16 detects the lesion area 52 from the endoscopic image 50, is not limited to the above-mentioned CNN, and the bounding box acquisition unit 16 may analyze feature quantities, such as a color, the gradient of pixel values, a shape, a size, and the like, of an image, using image processing to detect the lesion area 52.

The analysis unit 17 analyzes the endoscopic image 50 to extract a contour of the lesion area 52, acquires a second region (a region shown by hatching) that is a region inside this contour, and analyzes the brightness information of the first and second regions. Specifically, the analysis unit 17 calculates a ratio of the second region to the first region. The ratio of the second region to the first region means an area ratio.

The adjustment unit 18 adjusts the bounding box 51 in a case where a result of the analysis performed by the analysis unit 17 satisfies a certain condition. Specifically, the adjustment unit 18 adjusts the bounding box 51 in a case where a ratio of the second region to the first region is equal to or less than a certain threshold value. In a case where a ratio of the second region to the first region is equal to or less than the certain threshold value, a large portion of a region other than the lesion area 52 are included in the bounding box 51. For this reason, the bounding box 51 in a case where a ratio of the second region to the first region is equal to or less than the certain threshold value is not suitable for machine learning. Accordingly, in order to correct this bounding box 51 and acquire a bounding box 51 suitable for machine learning, the adjustment unit 18 adjusts the bounding box 51. The adjustment unit 18 does not adjust the bounding box 51 in a case where a ratio of the second region to the first region exceeds the certain threshold value.

A change in the position of the bounding box 51 in the endoscopic image 50 and a reduction in the area of the bounding box 51 are made as the adjustment of the bounding box 51 that is made by the adjustment unit 18. Before adjusting the bounding box 51, the adjustment unit 18 uses the brightness values of the first and second regions to calculate a coordinate position of a bounding box centroid GO1 that is the centroid of the bounding box 51, a coordinate position of a lesion area centroid GO2 (object-to-be-detected centroid) that is the centroid of the lesion area 52, a lesion area moment (object-to-be-detected moment) that is the moment of the lesion area 52 around the lesion area centroid GO2, and a bounding box moment that is the moment of the bounding box 51 around the lesion area centroid GO2.

First, the coordinate positions of the bounding box centroid GO1 and the lesion area centroid GO2 in the endoscopic image 50 are obtained from, for example, a well-known image moment calculation and are calculated from the following equation (1). f(i,j) is the brightness value of a pixel corresponding to coordinates (i,j). p and q are natural numbers including 0.

$$m_{pq} = \sum_i \sum_j i^p j^q f(i, j) \tag{1}$$

$m_{00}$, $m_{10}$, and $m_{01}$ are calculated from Equation (1), and the coordinate position of a centroid $G(i_G, j_G)$ is calculated from the following equation (2).

$$G(i_G, j_G) = \left(\frac{m_{10}}{m_{00}}, \frac{m_{01}}{m_{00}}\right) \quad (2)$$

In a case where the brightness information of the first and second regions are used in Equations (1) and (2) described above to make a calculation, the coordinate positions of the bounding box centroid GO1 and the lesion area centroid GO2 are calculated. Next, the adjustment unit 18 obtains a bounding box moment M1, which is a moment around the lesion area centroid GO2, and a lesion area moment M2 around the lesion area centroid GO2 from, for example, a well-known image moment calculation. A moment around a centroid is calculated from the following equation (3).

$$m_{pq} = \sum_i \sum_j (i - i_G)^p (j - j_G)^q f(i, j) \quad (3)$$

As shown in (A) and (B) of FIG. 4, the adjustment unit 18 adjusts the bounding box 51, that is, changes the position of the centroid of the bounding box 51 and a width W1 and a height H1 of the bounding box 51. In a case where the adjustment unit 18 adjusts the bounding box 51, the adjustment unit 18 uses the bounding box centroid GO1, the lesion area centroid GO2, the bounding box moment M1, and the lesion area moment M2 described above. (A) of FIG. 4 shows a bounding box that is not yet adjusted by the adjustment unit 18, and (B) of FIG. 4 shows an adjusted bounding box.

As the adjustment of the bounding box 51, the adjustment unit 18 causes the bounding box centroid GO1 to coincide with the lesion area centroid GO2, calculates a ratio M1/M2 of the bounding box moment M1 to the lesion area moment M2, and reduces the width W1 and/or the height H1 to a width W2 and/or a height H2 in a case where the ratio M1/M2 exceeds a certain threshold value (a state shown in (B) of FIG. 4). In (B) of FIG. 4, a white circle indicates the bounding box centroid GO1 before adjustment and a black circle indicates the bounding box centroid GO1 after adjustment.

Then, the adjustment unit 18 calculates a bounding box moment M1 and a ratio M1/M2 again, and determines the width W2 and the height H2 in a case where the ratio M1/M2 is equal to or less than a certain threshold value. A condition in which the brightness value of the lesion area 52 is larger than that of a region other than the lesion area 52 in the endoscopic image 50 is considered as a premise of the calculation of the ratio M1/M2 and the determination of the width W2 and the height H2. For this reason, in a case where the bounding box centroid GO1 is aligned with the lesion area centroid GO2, the value of an image moment, which is a value to which the brightness value is added, is increased around the lesion area centroid GO2. However, as a region is away from the lesion area centroid GO2, the brightness value of the region is reduced and the value of an image moment of the region is reduced (the region does not include the lesion area 52). Accordingly, in order to remove a region of which the value of an image moment is small (a region not including the lesion area 52), the adjustment unit 18 reduces the width W1 and/or the height H1 of the bounding box 51 and reduces the bounding box moment M1. As a result, the above-mentioned ratio M1/M2 is reduced. Further, in a case where the ratio M1/M2 is equal to or less than the certain threshold value, a region other than the lesion area 52 is reduced in the bounding box 51. As a result, data suitable for machine learning are obtained. In a case where the adjustment unit 18 makes an adjustment, the adjustment unit 18 may reduce the width and height of the bounding box 51 and repeatedly recalculate a bounding box moment M1 and a ratio M1/M2 until the ratio M1/M2 is equal to or less than the certain threshold value.

The adjustment unit 18 makes an adjustment as described above, so that the position of the adjusted bounding box 51 is changed to a position where the bounding box centroid GO1 is the lesion area centroid GO2 and the area of the adjusted bounding box 51 is reduced as compared to the area of the bounding box 51 not yet adjusted. The endoscopic image 50 and the adjusted bounding box 51 are input to the storage controller 19.

The storage controller 19 associates a new adjusted bounding box 51 with the endoscopic image 50. In addition, the storage controller 19 stores the endoscopic image 50 and the new adjusted bounding box 51, which is associated with the endoscopic image 50, in the storage device 13. In this case, it is preferable that the bounding box 51 is added to the endoscopic image 50 as accessory information of the endoscopic image 50. Alternatively, the endoscopic image 50 and the bounding box 51 may be separately stored, and information in which the endoscopic image 50 and the bounding box 51 are linked to each other may be added to each of the endoscopic image 50 and the bounding box 51 and are stored.

The storage device 13 is a hard disk drive, a solid-state drive, and/or the like built in the medical image processing device 11. The storage device 13 is not limited thereto, and an external storage device connected to the medical image processing device 11 via a cable or a network, a cloud service in which data are stored in a server connected to the medical image processing device 11 via the Internet, or the like may be used as the storage device 13. In a case where the medical image processing device 11 is to perform various types of processing, the display controller 21 causes the display 12 to display a setting screen on which a user performs a setting operation.

A series of flows in which the medical image processing device 11 acquires and adjusts the bounding box 51, associates the bounding box 51 with the endoscopic image 50, and stores the bounding box 51 and the endoscopic image 50 will be described with reference to a flowchart shown in FIG. 5. The image acquisition unit 15 sequentially acquires the endoscopic images 50 from the endoscope processor device 103 (S101). The bounding box acquisition unit 16 acquires the bounding box 51, which indicates the rectangular first region in which at least a part of the lesion area 52 is included, from the endoscopic image 50 (S102). Further, the analysis unit 17 acquires the second region that is a region inside the contour of the lesion area 52, and analyzes the brightness information of the first and second regions (S103).

The adjustment unit 18 compares a ratio of the second region to the first region with a certain threshold value (S104). Then, in a case where the ratio of the second region to the first region is equal to or less than the certain threshold value (Y in S104), the adjustment unit 18 adjusts the bounding box 51 (S105). In a case where the ratio of the second region to the first region exceeds the certain threshold value (N in S104), the adjustment unit 18 does not adjust the bounding box 51. In this case, the storage controller 19 stores the endoscopic image 50 and an unadjusted bounding box 51 associated with the endoscopic image 50 (S108).

As described above, as the adjustment of the bounding box 51, the adjustment unit 18 causes the centroid of the bounding box 51 to coincide with the centroid of the lesion area 52 and reduces the width and/or the height of the bounding box 51. In a case where the ratio M1/M2 between the moments is equal to or less than a certain threshold value (Yin S106) after the bounding box 51 is adjusted, the adjustment unit 18 determines the width and the height of the bounding box 51 (S107). On the other hand, in a case where the ratio M1/M2 between the moments exceeds the certain threshold value (N in S106), the adjustment unit 18 reduces the width and the height of the bounding box 51 again and calculates a bounding box moment M1 and a ratio M1/M2 (S105). Then, in a case where the ratio M1/M2 is equal to or less than the certain threshold value, the adjustment unit 18 determines the width and the height of the bounding box 51 as described above (S107).

In a case where the adjustment unit 18 adjusts the bounding box 51 and determines the width and the height of the bounding box 51, the storage controller 19 stores the endoscopic image 50 and a new adjusted bounding box 51 associated with the endoscopic image 50 (S108). The stored endoscopic image 50 and the stored bounding box 51 are used as correct answer data for machine learning.

Since an adjustment for changing the position of the bounding box 51 and reducing the area of the bounding box 51 is made in the medical image processing device 11 as described above, a region other than the lesion area 52 is reduced in the bounding box 51. As a result, correct answer data suitable for machine learning are obtained.

Further, in a case where the adjustment unit 18 adjusts the bounding box 51, the adjustment unit 18 uses the bounding box centroid GO1, the lesion area centroid GO2, the bounding box moment M1, and the lesion area moment M2 to change the centroid of the bounding box 51 and the width and the height of the bounding box 51. Accordingly, the adjustment unit 18 can adjust the bounding box 51 with a high accuracy, so that correct answer data more suitable for machine learning are obtained.

Second Embodiment

An endoscopic image and a new adjusted bounding box associated with the endoscopic image are stored in the storage device in the first embodiment, but the present invention is not limited thereto. An endoscopic image and a new adjusted bounding box associated with the endoscopic image may be input to a learning unit that performs machine learning. In the following description, the same components as those of the medical image processing device 11 according to the first embodiment will be denoted by the same reference numerals as those of the medical image processing device 11 and the description thereof will be omitted.

As shown in FIG. 6, a medical image processing device 61 includes a learning unit 62. The learning unit 62 corresponds to a learning device of claims. The medical image processing device 61 is provided with the same central controller as that of the medical image processing device 11 according to the first embodiment, and the central controller executes a program, so that the functions of the learning unit 62 in addition to an image acquisition unit 15, a bounding box acquisition unit 16, an analysis unit 17, an adjustment unit 18, a storage controller 19, and a display controller 21 are realized.

In the medical image processing device 61 according to this embodiment, an endoscopic image 50 and a new adjusted bounding box 51 associated with the endoscopic image 50 are input to the learning unit 62 and the learning unit 62 performs machine learning for a lesion area (an object to be detected). A configuration and a series of flows from the acquisition of the endoscopic image 50 up to the adjustment of the bounding box 51 are the same as those of the first embodiment.

Further, the endoscopic image 50 and the new adjusted bounding box 51 associated with the endoscopic image 50 may be input to and stored in the storage device 13 as in the first embodiment, and may be input to only the learning unit 62 and may not be input to the storage device 13.

A flow in which the medical image processing device 61 acquires and adjusts the bounding box 51, associates the bounding box 51 with the endoscopic image 50, and stores the bounding box 51 and the endoscopic image 50 will be described with reference to a flowchart shown in FIG. 7. The acquisition of the endoscopic image 50 (S201), the acquisition of the bounding box 51 (S202), the analysis of the first region and the second region (S203 and S204), and the adjustment of the bounding box 51 (S205 to S207) are the same processing as S101 to S107 of the flowchart of the first embodiment.

In a case where the bounding box 51 is adjusted and the width and the height of the bounding box 51 are determined (S207), the adjustment unit 18 inputs the endoscopic image 50 and a new adjusted bounding box 51 associated with the endoscopic image 50 to the learning unit 62 (S208). The learning unit 62 performs machine learning for a lesion area (an object to be detected) using the endoscopic image 50 and the bounding box 51 (S209).

Since an adjustment for changing the position of the bounding box 51 and reducing the area of the bounding box 51 is made in the medical image processing device 61 as described above, a region other than the lesion area 52 is reduced in the bounding box 51. As a result, correct answer data suitable for machine learning are obtained. That is, the same effects as the first embodiment can be obtained. In addition, since the endoscopic image 50 and the bounding box 51 are input to the learning unit 62 as the correct answer data, a discriminator, which can detect a lesion area with a high accuracy and can discriminate the type of a lesion, can be generated in a case where the learning unit 62 performs machine learning.

First Modification Example

In each embodiment, in a step where the bounding box acquisition unit 16 acquires a bounding box not yet adjusted, a lesion area, which is an object to be detected, is detected by machine learning, such as CNN, and a bounding box circumscribed about the lesion area is acquired. However, the present invention is not limited thereto and, as shown in (A) and (B) of FIG. 8, the bounding box acquisition unit 16 may receive a bounding box, which is input to an endoscopic image 50 displayed on the display 12 by a medical doctor who is a user, to acquire a bounding box that is not yet adjusted.

In an example shown in (A) and (B) of FIG. 8, an input from a user is made in a case where a user designates a first point P1 positioned on the upper left side of the bounding box 51 (see (A) of FIG. 8) and designates a second point P2 that is positioned on the lower right side and is diagonal to the first point of the bounding box 51 (see (B) of FIG. 8). The first and second points P1 and P2 are designated by, for example, the operation of the mouse of the input device 14, the operation of a finger on the touch panel, or the like. Then, the bounding box acquisition unit 16 receives the bounding box 51 that is input by the user in this way. A flow after the acquisition of the bounding box 51 is the same as that of each embodiment.

The bounding box 51 is acquired from the endoscopic image 50 by the medical image processing devices 11 and 61 or the bounding box 51 is input by a user in the respective embodiments and the modification example, but the present invention is not limited thereto. Before the medical image processing devices 11 and 61 acquire the endoscopic image 50, for example, a bounding box 51 acquired in advance by the endoscope processor device 103 or the like may be acquired. Likewise, before the medical image processing devices 11 and 61 acquire a lesion area 52 (an object to be detected), a lesion area 52 shown in the endoscopic image 50 acquired in advance may be acquired as the second region. In these cases, it is preferable that the bounding box 51 and/or the lesion area 52 acquired in advance is input to the medical image processing devices 11 and 61 in a state where the bounding box 51 and/or the lesion area 52 acquired in advance are associated with the endoscopic image 50. It is preferable that the first region is a region detected as a rectangular region using an object detection method or the like. Further, it is preferable that the second region is a region obtained in a case where the lesion area 52 is detected in a shape different from a rectangular region using a segmentation method, contour extraction, or the like. Since the information of the second region is used in addition to information of the first region, the bounding box can be reduced in size to fit the size of the lesion area 52 better.

Second Modification Example

In each embodiment, the analysis unit 17 performs an analysis and a condition in which a ratio of the second region to the first region is equal to or less than a certain threshold value is exemplified as a certain condition in a case where the adjustment unit 18 adjusts the bounding box 51. However, the present invention is not limited thereto. As shown in (A) and (B) of FIG. 9, a low-brightness region having a brightness value equal to or less than a certain value in a first region is extracted and a condition in which a ratio of the low-brightness region to the first region is equal to or larger than a certain threshold value may be used as the above-mentioned certain condition.

As shown in (A) of FIG. 9, the analysis unit 17 analyzes a bounding box 51 that is acquired from the endoscopic image 50 and is not yet adjusted. After that, the analysis unit 17 extracts a low-brightness region LA1 (a region shown by cross-hatching) having a brightness value equal to or less than a certain value in the bounding box 51, that is, in the first region as shown in (B) of FIG. 9, and obtains a ratio of the low-brightness region LA1 to the first region. The ratio mentioned here means an area ratio of the low-brightness region LA1 to the first region. Then, the adjustment unit 18 adjusts the bounding box 51 in a case where the ratio of the low-brightness region LA1 to the first region is equal to or larger than a certain threshold value.

As described above, a lesion area 52 has a brightness value larger than the brightness value of a region other than the lesion area 52 in the endoscopic image 50. Accordingly, there is a high possibility that the low-brightness region LA1 is a region other than the lesion area 52, and the bounding box 51 needs to be adjusted in a case where a large portion of the low-brightness region LA1 is included in the bounding box 51. A flow after the adjustment of the bounding box 51 is the same as that of each embodiment.

Third Modification Example

Further, the certain condition in a case where the adjustment unit 18 adjusts the bounding box 51 is not limited to the conditions described in each embodiment and the second modification example. A ratio of a bounding box to an endoscopic image may be calculated and a condition in which this ratio is equal to or larger than a certain threshold value may be used as the above-mentioned certain condition. FIG. 10 is a diagram illustrating an example of a case where a ratio of a bounding box 51 to an endoscopic image 50 is equal to or larger than a certain threshold value.

In FIG. 10, the bounding box 51 has an area close to the area of the endoscopic image 50. That is, a ratio of the bounding box 51 to the endoscopic image 50 is large and is equal to or larger than a certain threshold value. Since a large portion of a region other than the lesion area 52 is included in the bounding box 51 in a case where this ratio is large, the bounding box 51 is not suitable for machine learning. Accordingly, the bounding box 51 needs to be adjusted. A flow after the adjustment of the bounding box 51 is the same as that of each embodiment.

Fourth Modification Example

Further, a condition in which a distance between a center or a centroid of a bounding box and a center of an endoscopic image is equal to or less than a certain threshold value may be used as the certain condition in a case where the adjustment unit 18 adjusts the bounding box 51. FIG. 11 is a diagram illustrating an example of a case where a distance between a center of a bounding box 51 and a center of an endoscopic image 50 is equal to or less than a certain threshold value.

In FIG. 11, a center O1 of the bounding box 51 and a center O2 of the endoscopic image 50 are present at positions close to each other. That is, a distance D between the center O1 and the center O2 is equal to or less than a certain threshold value. Since a large portion of a region other than the lesion area 52 is included in the bounding box 51 in a case where this distance D is short, the bounding box 51 is not suitable for machine learning. Accordingly, the bounding box 51 needs to be adjusted. A flow after the adjustment of the bounding box 51 is the same as that of each embodiment. Further, a condition in which the distance D between the center of the bounding box 51 and the center of the endoscopic image 50 is equal to or less than the certain threshold value is used as the certain condition in an example shown in FIG. 11, but the present invention is not limited thereto. A condition in which the distance D between the centroid of the bounding box 51 and the center of the endoscopic image 50 is equal to or less than a certain threshold value may be used as the certain condition.

Fifth Modification Example

In each embodiment, as the adjustment of the bounding box, the centroid and the moment of the lesion area and the centroid and the moment of the bounding box are calculated, and the centroid, the width, and the height of the bounding box are changed in a case where the ratio between the moments exceeds a certain threshold value. However, the present invention is not limited thereto and, as shown in (A), (B), (C), and (D) of FIG. 12, a low-brightness region LA2 having a brightness value equal to or less than a certain value in a bounding box 51 may be excluded and new bounding boxes 51 circumscribed about new second regions of the endoscopic image 50 excluding the low-brightness region LA2 may be calculated.

As shown in (A) of FIG. 12, the adjustment unit 18 acquires the brightness information of a bounding box 51 in an endoscopic image 50. As shown in (B) of FIG. 12, the adjustment unit 18 extracts a low-brightness region LA2 (a region shown by cross-hatching) having a brightness value equal to or less than a certain value in the bounding box 51. A flow from the acquisition of the endoscopic image 50 up to the acquisition and analysis of a bounding box 51, which is not yet adjusted, is the same as that of each embodiment.

As shown in (C) of FIG. 12, the adjustment unit 18 then excludes the low-brightness region LA2 from the bounding box 51. Since the low-brightness region LA2 is excluded from the bounding box 51, a part of a lesion area 52 is cut off and second regions (regions shown by hatching) are formed. Then, the adjustment unit 18 calculates new bounding boxes circumscribed about the new second regions of the endoscopic image 50 excluding the low-brightness region LA2.

Since the low-brightness region LA2 is excluded in an example shown in (C) of FIG. 12, a state where a region inside the contour of the lesion area 52 is divided into two second regions 52A and 52B is made. For this reason, the adjustment unit 18 calculates new bounding boxes 51A and 51B that are circumscribed about the divided second regions 52A and 52B, respectively. Since the area of the second regions 52A and 52B from which the low-brightness region LA2 is excluded is smaller than the area of the lesion area 52 not yet adjusted, the widths and/or the heights of the bounding boxes 51A and 51B circumscribed about the second regions 52A and 52B are also reduced. Accordingly, a region other than a lesion area 52 is reduced in the bounding boxes 51A and 51B, so that data suitable for machine learning are obtained.

In this modification example, well-known sharpness processing (contour enhancement processing) may be performed on the endoscopic image 50. Accordingly, since the contours of the second regions 52A and 52B are enhanced and blurred portions of boundaries are removed, the adjusted second regions 52A and 52B are surely smaller than the lesion area 52 not yet adjusted and the bounding boxes 51A and 51B circumscribed about the adjusted second regions 52A and 52B are also reduced in size.

Then, as shown in (D) of FIG. 12, the adjustment unit 18 associates the new adjusted bounding boxes 51A and 51B with the endoscopic image 50 and stores the endoscopic image 50 and the new adjusted bounding boxes 51A and 51B associated with the endoscopic image 50 as in the first embodiment. Alternatively, the adjustment unit 18 inputs the endoscopic image 50 and the new adjusted bounding box 51 associated with the endoscopic image 50 to the learning unit 62 as in the second embodiment. Accordingly, the same effects as the each embodiment can be obtained.

The new bounding boxes circumscribed about the new second regions of the endoscopic image 50 excluding the low-brightness region LA2 are calculated in the fifth modification example, but the present invention is not limited thereto. After the bounding boxes 51A and 51B circumscribed about the new second regions 52A and 52B are calculated, the same adjustment as the first and second embodiments may be further made. In this case, the adjustment unit 18 uses the brightness values of the first and second regions excluding the low-brightness region LA2 to calculate bounding box centroids that are the centroids of the bounding boxes 51A and 51B, lesion area centroids that are the centroids of the lesion areas (the second regions 52A and 52B), the lesion area moments of the lesion areas (the second regions 52A and 52B), and the bounding box moments of the bounding boxes 51A and 51B.

Then, the adjustment unit 18 uses the bounding box centroids, the lesion area centroids, the bounding box moments, and the lesion area moments to change the positions of the centroids of the bounding boxes 51A and 51B and the widths and the heights of the bounding boxes 51A and 51B as in the first and second embodiments. Accordingly, the bounding boxes 51A and 51B are adjusted with a higher accuracy, so that correct answer data more suitable for machine learning are obtained.

Further, an example in which a region inside the contour of the lesion area 52 is divided into two second regions 52A and 52B since the low-brightness region LA2 is excluded is described in the fifth modification example, but the present invention is not limited thereto. In a case where a low-brightness region LA2 of a bounding box 51 is removed to form a new second region having an area smaller than the area of the original second region and a bounding box is adjusted to correspond to the new second region, the same effects as the fifth modification example can be obtained.

With regard to the endoscope system 100, a capsule endoscope may be used as the endoscope 102. In this case, the light source device 101 and a part of the endoscope processor device 103 can be mounted on the capsule endoscope.

Further, the medical image is not limited to an endoscopic image described in each of the embodiments and the modification examples, but it is preferable that the medical image is a medical image obtained in a case where an image of a lumen in a body having a dimension in a depth direction larger than a dimension in a radial direction is picked up. Furthermore, in each of the embodiments and the modification examples, the analysis unit 17 and the adjustment unit 18 analyze the brightness information and the brightness values of the first and second regions and adjust the bounding box 51 using the results of the analysis. However, the present invention is not limited thereto, and the analysis unit 17 and the adjustment unit 18 may make an analysis and adjust the bounding box 51 using the pixel information and the pixel values of the first and second regions.

In each of the embodiments and the modification examples, the hardware structures of processing units, which perform various types of processing, such as the image acquisition unit 15, the bounding box acquisition unit 16, the analysis unit 17, the adjustment unit 18, the storage controller 19, the display controller 21, and the learning unit 62, are various processors to be described below. Various processors include: a central processing unit (CPU) that is a general-purpose processor functioning as various processing units by executing software (program); a programmable logic device (PLD) that is a processor of which the circuit configuration can be changed after manufacture, such as a field programmable gate array (FPGA); a dedicated electrical circuit that is a processor having circuit configuration designed exclusively to perform various types of processing; a graphical processing unit (GPU) that performs a large amount of processing, such as image processing, in parallel; and the like.

One processing unit may be formed of one of these various processors, or may be formed of a combination of two or more processors of the same type or different types (for example, a plurality of FPGAs, a combination of a CPU and an FPGA, or a combination of a CPU and a GPU). Further, a plurality of processing units may be formed of one processor. As an example where a plurality of processing units are formed of one processor, first, there is an aspect where one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

In addition, the hardware structures of these various processors are more specifically electrical circuitry where circuit elements, such as semiconductor elements, are combined.

EXPLANATION OF REFERENCES

10: medical image processing system
11: medical image processing device
12: display
13: storage device
14: input device
15: image acquisition unit
16: bounding box acquisition unit
17: analysis unit
18: adjustment unit
19: storage controller
21: display controller
50: endoscopic image
51: bounding box
51A, 51B: bounding box
52: lesion area
52A, 52B: second region
61: medical image processing device
62: learning unit
100: endoscope system
101: light source device
102: endoscope
103: endoscope processor device
104: display
D: distance
G: centroid
GO1: bounding box centroid
GO2: lesion area centroid
H1, H2: height
LA1, LA2: low-brightness region
M1: bounding box moment
M2: lesion area moment
O1, O2: center
P1: first point
P2: second point
W1, W2: width

What is claimed is:

1. A medical image processing device comprising:
a processor configured to:
acquire a medical image;
acquire a bounding box that corresponds to an object to be detected shown in the acquired medical image and indicates a first region in which at least a part of the object to be detected is included;
make an adjustment for changing a position of the bounding box in the medical image and reducing an area of the bounding box on the basis of the medical image; and
associate a new adjusted bounding box with the medical image, wherein the processor is further configured to:
acquire the object to be detected shown in the medical image as a second region;
analyze brightness information or pixel information of the first region and the second region; and
adjust the bounding box in a case where a result of the analysis satisfies a certain condition,
the processor is further configured to calculate a ratio of the second region to the first region as the analysis, and adjust the bounding box in a case where the ratio is equal to or less than a certain threshold value, and
the medical image processing device further comprises a learning device to which the medical image and the new adjusted bounding box associated with the medical image are input and which performs machine learning for the object to be detected.

2. The medical image processing device according to claim 1,
wherein the processor is further configured to extract a contour of the object to be detected from the medical image and acquires a region inside the contour as the second region.

3. The medical image processing device according to claim 2,
wherein the processor is further configured to analyze the medical image, extracts the contour of the object to be detected according to a brightness value or a pixel value of the medical image, and acquire the second region.

4. The medical image processing device according to claim 1,
wherein the processor is further configured to extract a low-brightness region having a brightness value equal to or less than a certain value in the first region, and adjust the bounding box in a case where a ratio of the low-brightness region to the first region is equal to or larger than a certain threshold value.

5. The medical image processing device according to claim 1,
wherein the processor is further configured to calculate a ratio of the bounding box to the medical image, and adjust the bounding box in a case where the ratio is equal to or larger than a certain threshold value.

6. The medical image processing device according to claim 1,
wherein the processor is further configured to adjust the bounding box in a case where a distance between a center or a centroid of the bounding box and a center of the medical image is equal to or less than a certain threshold value.

7. The medical image processing device according to claim 1,
wherein the processor is further configured to:
use brightness values or pixel values of the first region and the second region to calculate an object-to-be-detected centroid that is a centroid of the object to be detected, an object-to-be-detected moment that is a moment around the object-to-be-detected centroid, and a bounding box moment that is a moment of the bounding box around the object-to-be-detected centroid; and change a centroid of the bounding box and a width and a height of the bounding box using the object-to-be-detected centroid, the object-to-be-detected moment, and the bounding box moment, as the adjustment.

8. The medical image processing device according to claim 7,
wherein the processor is further configured to, as the adjustment, cause a position of the centroid of the bounding box to coincide with a position of the object-to-be-detected centroid, calculate a ratio of the bounding box moment to the object-to-be-detected moment, and reduce the width and/or the height and calculate the bounding box moment again in a case where the ratio exceeds a certain threshold value and determines the width and the height in a case where the ratio is equal to or less than the certain threshold value.

9. The medical image processing device according to claim 1,
wherein the processor is further configured to:
exclude a low-brightness region having a brightness value equal to or less than a certain value in the bounding box; and
calculate a new bounding box, which is circumscribed about a new second region of the medical image excluding the low-brightness region, as the adjustment.

10. The medical image processing device according to claim 9,
wherein the processor is further configured to, in a case where the second region is divided into regions since the low-brightness region is excluded, calculate new bounding boxes circumscribed about the divided regions of the second region, respectively.

11. The medical image processing device according to claim 1,
wherein the medical image and the new adjusted bounding box associated with the medical image are stored.

12. The medical image processing device according to claim 1,
wherein the medical image is an endoscopic image obtained in a case where an image of a lumen in a body having a dimension in a depth direction larger than a dimension in a radial direction is picked up with an endoscope, and
the object to be detected is a lesion area.

13. The medical image processing device according to claim 1,
wherein the processor is further configured to, in a case where the processor is to acquire the bounding box not yet adjusted, receive the bounding box input by a user.

14. The medical image processing device according to claim 1,
wherein the processor is further configured to, in a case where the processor is to acquire the bounding box not yet adjusted, extract the object to be detected shown in the medical image and calculate the bounding box circumscribed about the extracted object to be detected.

15. A method of operating a medical image processing device, the method comprising:
acquiring a medical image;
acquiring a bounding box that corresponds to an object to be detected shown in the acquired medical image and indicates a first region in which at least a part of the object to be detected is included;
making an adjustment for changing a position of the bounding box in the medical image and reducing an area of the bounding box on the basis of the medical image; and
associating a new adjusted bounding box with the medical image, wherein
the method further comprises:
acquiring the object to be detected shown in the medical image as a second region;
analyzing brightness information or pixel information of the first region and the second region; and
adjusting the bounding box in a case where a result of the analysis satisfies a certain condition,
the method further comprises calculating a ratio of the second region to the first region as the analysis, and adjusting the bounding box in a case where the ratio is equal to or less than a certain threshold value, and
the method further comprises performing machine learning for the object to be detected using a learning device to which the medical image and the new adjusted bounding box associated with the medical image are input.

* * * * *